United States Patent

Housh et al.

[11] 4,229,423
[45] Oct. 21, 1980

[54] METHOD OF PRODUCING MAGNESIUM HYDROXIDE

[75] Inventors: Lloyd M. Housh, Santa Clara; William R. Alder, Livermore, both of Calif.

[73] Assignee: Kaiser Aluminum & Chemical Corporation, Oakland, Calif.

[21] Appl. No.: 10,577

[22] Filed: Feb. 9, 1979

[51] Int. Cl.$^2$ .................................................. C01F 5/22
[52] U.S. Cl. ...................................... 423/164; 423/639
[58] Field of Search ........................... 423/163, 164, 639

[56] References Cited

U.S. PATENT DOCUMENTS

| | | | |
|---|---|---|---|
| 2,573,616 | 10/1951 | Seailles | 423/164 |
| 2,595,314 | 5/1952 | Vettel et al. | 423/164 |
| 2,692,816 | 10/1954 | Vettel et al. | 423/164 |
| 2,893,840 | 7/1959 | Vettel et al. | 423/164 |
| 3,425,804 | 2/1969 | Rastrelli | 423/164 |
| 3,787,558 | 1/1974 | Briggs et al. | 423/164 |

FOREIGN PATENT DOCUMENTS 1413871 11/1975 United Kingdom .
1502422 3/1978 United Kingdom .

Primary Examiner—Wayne A. Langel
Attorney, Agent, or Firm—Paul E. Calrow; Malcolm McQuarrie

[57] ABSTRACT

A magnesium hydroxide of low lime and boron content is produced from a brine containing magnesium chloride and over 1 ppm boron (on a $B_2O_3$ basis) by treating it to reduce its $CO_2$ content to less than 15 ppm and reacting it with an excess of active lime in a first reaction stage, decanting the spent brine from the precipitated high lime magnesium hydroxide, and then reacting the high lime magnesium hydroxide with additional brine in a second reaction stage to produce a magnesium hydroxide containing less than 1% CaO and less than 0.1% $B_2O_3$ on the ignited basis. A portion of the high lime magnesium hydroxide from the first reaction stage is recycled to that stage as seed. Before being discarded, the spent brine from the first reaction stage may be reacted with treated brine to precipitate magnesium hydroxide of relatively high CaO and $B_2O_3$ content.

7 Claims, 1 Drawing Figure

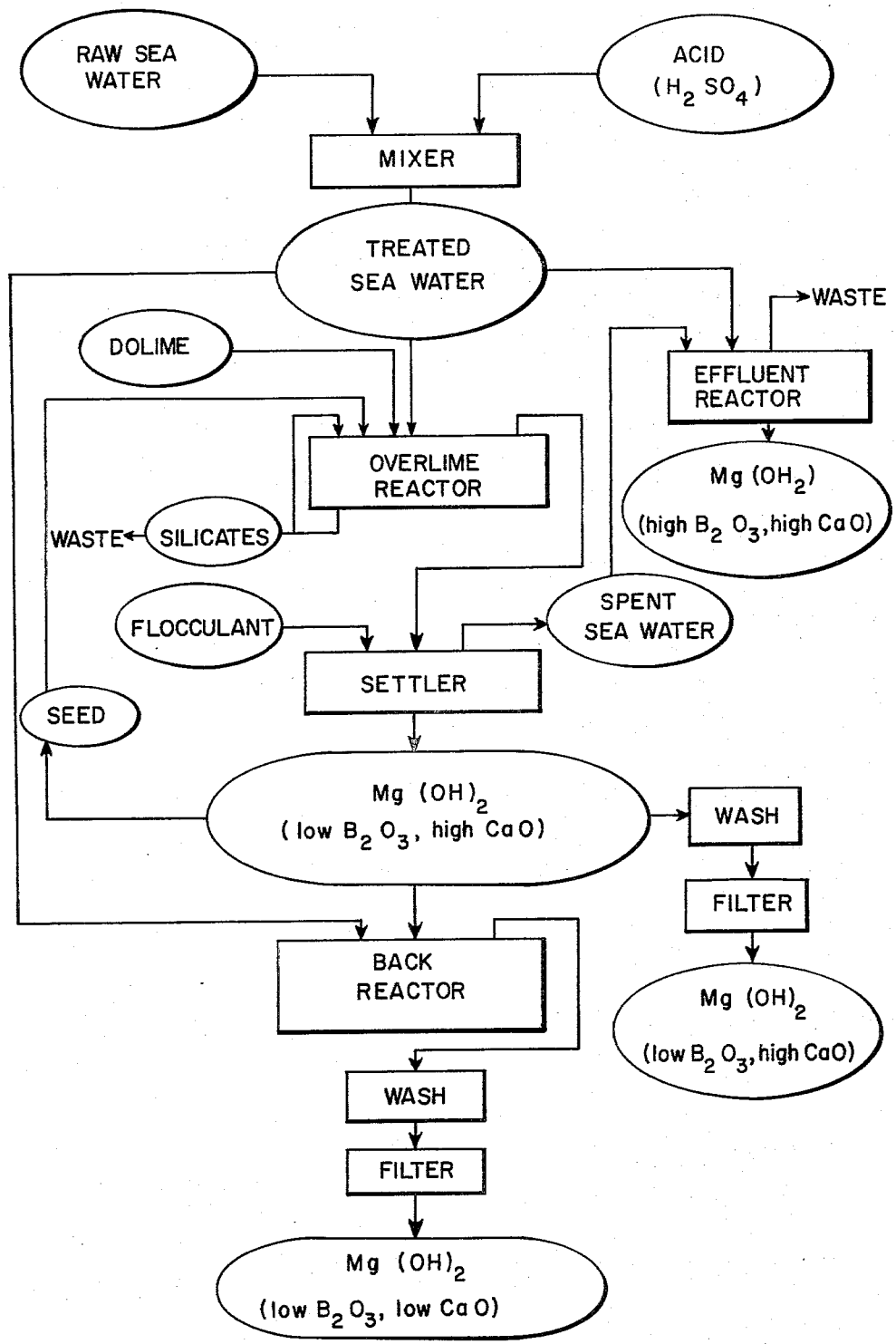

METHOD OF PRODUCING MAGNESIUM HYDROXIDE

BACKGROUND OF THE INVENTION

This invention concerns a method of producing magnesium hydroxide by reacting lime (CaO) with brine containing $Mg^{++}$ ions and over 1 ppm boron (on a $B_2O_3$ basis) wherein an excess of lime is reacted with the brine in a first reaction stage, and the high lime magnesium hydroxide is reacted with further brine in a second reaction stage.

Although there are many uses for magnesium hydroxide, one important one is as a raw material for producing refractory grain containing over 90%, and preferably over 95%, MgO. The production of such periclase refractory grain from magnesium hydroxide produced by reacting a brine containing magnesium ion with active lime has been practiced for many years (see Br. Pat. No. 1,502,422), and it is well-known that the properties of the refractory grain are highly dependent on the type and amount of impurities in the material.

For example, it is known that a refractory grain, and resulting refractory products such as brick, have greater strength when the boron content of the grain is low, for example less than 0.1%, and as low as 0.03% or lower. In this connection, U.S. Pat. No. 3,425,804 sets forth a method of achieving a low boron content magnesium hydroxide.

It is also known that the amounts of lime (CaO) and silica ($SiO_2$), and particularly their relative amounts, influence the properties, particularly the high temperature strength, of periclase refractory grain. Specifically, grain having approximately a 2 to 1 weight ratio of lime to silica shows increased high temperature strength. Therefore, it is known to attempt to control the amount of lime in magnesium hydroxide produced as precursor to periclase refractory grain; see British Pat. No. 1,413,871.

One of the important properties of refractory grain is its density. It is desirable to have a periclase grain with a bulk specific gravity (BSG) of at least 3.35, and preferably of at least 3.40. Again, it has been found that the relative amounts of the minor impurities in magnesium hydroxide used to produce periclase grain greatly affect the sintered density of the grain.

Although it is possible to reduce the boron content of periclase refractory grain by firing it at very high temperatures (e.g., 1800° C. or higher), it has been found that to achieve the highest BSG in such grain, it is essential that the magnesium hydroxide from which it is made be of low boron content. In other words, although it is possible to take a magnesium hydroxide containing, for example, 0.3% $B_2O_3$ on the ignited basis, and fire this at 1800° C. to produce a periclase grain, reducing the boron content to as low as 0.03% $B_2O_3$, the BSG of the grain will be considerably lower (e.g., 3.25 as opposed to 3.4 or greater) than that of a grain similarly processed but using a magnesium hydroxide which contains only 0.05% $B_2O_3$ to begin with. Thus, not only is it desirable to have a low boron content in the fired grain itself, but it is necessary to have a low boron content in the initial magnesium hydroxide in order to achieve the highest bulk specific gravity.

It has been known for some time that it is possible to reduce the amount of boron in a magnesium hydroxide produced from a boron-containing brine by precipitation with active lime if an excess amount of lime is used in the precipitation. However, in previous processes using this method, the resulting magnesium hydroxide has a higher lime content than is most desirable. Although such "high lime" magnesium hydroxides (i.e., magnesium hydroxide containing over 1% CaO, and specifically having a lime to silica ratio of 2 or greater) sinter rather readily, there are many applications where a lower lime content is desired.

According to the process of this invention, it is possible to produce a magnesium hydroxide which contains, on the ignited basis, less than 1% CaO and less than 0.1% $B_2O_3$, and which will sinter to a BSG of over 3.40.

SUMMARY

It has now been found, according to this invention, that such a magnesium hydroxide can be produced by (1) treating a brine containing $Mg^{++}$ ions and at least 1 ppm boron (on a $B_2O_3$ basis) so as to reduce its $CO_2$ content to less than 15 ppm, (2) reacting the treated brine with an excess of calcined lime in a first reaction stage, (3) separating the high-lime magnesium hydroxide so produced from the spent brine, (4) recycling part of the high-lime magnesium hydroxide from the first reaction stage back to the first reaction stage as seed, and (5) reacting the remainder of the high-lime magnesium hydroxide produced in the first reaction stage with further treated brine in a second reaction stage, whereby a magnesium hydroxide is produced which contains, on the ignited basis, less than 1% CaO and less than 0.1% $B_2O_3$, all percentages being by weight.

BRIEF DESCRIPTION OF THE DRAWING

The drawing represents a flow sheet of the process of the present invention, including certain optional but advantageous additional steps.

DETAILED DESCRIPTION

The brine used in this invention will be any brine with a boron content sufficiently high that the resulting magnesium hydroxide would otherwise contain more boron than desired. While the exact value of this level will vary somewhat for different precipitation processes (since different processes may cause different fractions of the boron present in the brine to be present in the precipitated magnesium hydroxide), generally speaking the process of this invention will be useful with any brine containing over 1 ppm boron (on a $B_2O_3$ basis). A common source of brine in this general process is sea water, although very often the process is operated with inland brines. It is essential that the brine be treated to reduce its $CO_2$ content to less than 15 ppm, preferably to about 10 ppm or less. The $CO_2$ content of the brine is determined by adding to it methyl orange-xylene cyanole indicator (producing a pale green color) and titrating with $H_2SO_4$ until the green color changes to pale yellow or colorless. When a 100 mL sample of brine is titrated with 0.02 N $H_2SO_4$, the ppm of $CO_2$ in the brine is 8.8 times the mLs of $H_2SO_4$ solution used to reach the end point.

There are various ways of reducing the $CO_2$ content of the brine (see, for example, U.S. 2,573,616). One convenient method is to treat the brine with acid, for example sulfuric acid. The reason this pretreatment of the brine is essential is that otherwise the $CO_2$ present will react with $Ca^{++}$ ions present in the reaction admixture to produce solid calcium carbonate, which is extremely difficult, if not impossible, to remove. This precipitated calcium carbonate will, of course, result in a higher "lime" content in the magnesium hydroxide.

The active lime used may be any such material, various ones such as calcined limestone, calcined oyster shells, and the like being well known. A particularly advantageous material is calcined dolomite, sometimes referred to as "dolime". Since dolomite is roughly half magnesium carbonate, yielding magnesium oxide when calcined, the magnesium values from the dolomite are added to those from the brine to produce a larger amount of magnesium hydroxide. When the term "active lime" is used in the specification and claims, it is intended to include materials such as dolime, as well as active lime (CaO) per se.

The active lime and treated brine are mixed together in a first stage or primary or overlime reactor where there is vigorous agitation. Also fed to the primary reactor is "seed" material which is magnesium hydroxide produced in this primary or overlime reactor. As is known in this art, from 80 to 95% or perhaps slightly more of the magnesium hydroxide produced is recycled as seed.

The overflow from the overlime reactor, containing spent brine (i.e., brine from which the $Mg^{++}$ ions have been removed) and the precipitated magnesium hydroxide (together with any magnesium hydroxide brought in when dolime is the source of active lime) goes to a settler, where flocculant can be added to assist in settling. The resulting precipitate is a magnesium hydroxide containing relatively low boron (e.g., less than 0.1%) but a relatively high amount of CaO (e.g., over 1%, for example about 2%). It is this material which is used as seed in the primary or overlime reactor.

In addition, this low boron, high lime magnesium hydroxide can be washed and filtered to produce a magnesium hydroxide suitable for producing certain types of refractory grain. However, this side stream is not an essential part of the present invention, and its use is merely an added advantage of the present process.

Relatively coarse materials will tend to settle in the bottom of the primary reactor. These are largely unreacted dolime particles and siliceous materials (e.g., clay). As is well known (see U.S. Pat. No. 2,893,840), the silica content of the magnesium hydroxide produced can be reduced by removing this material, recycling it to the primary reactor to remove more of its lime values, and eventually discarding it as its silica content increases.

Returning to the main process, the spent brine is removed from the top of the settler and reacted with treated brine in an effluent reactor to precipitate a magnesium hydroxide of high boron and relatively high lime content. Generally, it will be advantageous to seed this reaction by recycling a portion of its product. Again, the magnesium hydroxide produced in this side reaction may also be useful for producing certain grades of periclase refractory grain. However, the main reason for treating the spent brine from the settler is that, due to the excess lime in the primary reactor, its pH is relatively high (over 11 and possibly as high as 13) and it is necessary to reduce its pH before it may be discarded, for example by returning sea water to the ocean. Also, this side reaction recovers a significant portion of the magnesium values in the treated brine reacted with the spent brine.

The portion of the magnesium hydroxide removed from the settler which is not returned to the primary reactor as seed is fed to a second stage or back reactor where it is reacted with further treated brine to reduce the excess lime, producing soluble $Ca^{++}$ ions and more magnesium hydroxide. The slurry from this second stage reactor is then washed and filtered to produce the low boron, low lime magnesium hydroxide sought by the process of this invention.

One of the features of the present invention is that the seed used in the primary reactor is the low boron, but high lime, magnesium hydroxide produced in the primary reaction, and is not the final low boron, low lime product. It has been found that when the final product of the process is used as seed in the primary reactor, and the decantation between the primary reactor and the back reactor is omitted, then the desired low lime and low boron contents are not obtained. The reason for this is not certain, and it is not desired to be bound to any particular theory; however, it is believed that in order to prevent boron from attaching to the magnesium hydroxide flocks formed in the primary reactor, it is essential to have not only excess lime in the reaction chamber, but also a seed of high lime content. Apparently boron will not deposit on the surface of such high lime material, but will deposit on seed of lower lime content.

It should be noted that the flow sheet of the drawing is schematic and omits many details which will be well known to those familiar with this art. For example, it is quite possible to conduct the primary reaction in a series of two or more reactors, or even in two or more reactors in parallel. Likewise, the settling may be carried out in more than one tank, and the washing also be done in more than one stage. However, all these details are conventional and will be known to those familiar with this art.

EXAMPLE

Sea water from the Pacific Ocean in the vicinity of Moss Landing, California, containing 15 ppm $B_2O_3$ and 2.1 g/L MgO in the form of $Mg^{++}$ ion was treated with sulfuric acid (at a rate of 0.14 g of acid per liter of sea water) to reduce the $CO_2$ content to about 10 ppm and fed, at a temperature of 16° C. (60° F.) and a rate of about 2500 mL per minute, to a seed pot where it was admixed with magnesium hydroxide seed. The sea water and seed were fed to the first of three chambers constituting the primary reactor where they were mixed with calcined dolomite from Natividad, California, under 2.37 mm in size (i.e., minus 8 mesh) at the rate of about 15 g/min. The reaction admixture passed in series through the three chambers of the primary reactor, there being vigorous agitation in the first two and more gentle agitation in the third.

The overflow from the primary reactor (about 2890 mL/min) was mixed with flocculant (brand name Nalco 8873) at a rate of about 0.014 g/min, and fed to the settler. The underflow from the settler was divided into two streams, the larger, about 390 mL/min being recycled to the seed pot and the smaller, about 55 mL/min, being sent to the back or secondary reactor tank, where it was mixed with more acid treated sea water, about 300 mL/min.

Control of the amount of dolime added to the primary reactor and of treated sea water added to the secondary reactor was primarily based on pH. Thus, the amount of dolime added in the primary reactor was sufficient to raise the pH in that reactor to about 11 or more, whereas the amount of sea water added in the secondary reactor was sufficient to lower the pH to about 10.

The product from the secondary reactor was washed, filtered, and dried. When examined under a transmission electron microscope, it was found to have a blocky morphology. Further treatment and testing are described below.

Sediment from the bottom of the third chamber of the primary reactor was removed and separated into two streams. The larger, about 170 mL/min, was recycled to the seed pot, while the smaller, about 70 mL/min, was fed to a tank where it was slurried with acid treated sea water. The overflow from this tank, containing the finest particles, was fed to the seed pot, while the underflow, containing coarser particles, was fed to a classifier. The coarser particles from the classifier were fed to a screen, the material passing over the screen, of coarser particle size and largely consisting of silicates, being sent to waste and the material passing through the screen being returned to the tank.

The high pH effluent from the settler was treated with sufficient acid treated sea water to lower its pH to 10.7, thus precipitating a high boron, high lime magnesium hydroxide. After this magnesium hydroxide was settled out, the effluent was discharged to waste.

During the continuous operation of this system, a portion of the high lime, low boron product from the first thickener was removed, washed, dried, and subjected to further examination, as described below. It had a blocky morphology similar to that of the principal product.

In a comparison study, the system just described was operated, but without any settling and decantation between the primary or overlime reactor and the secondary or back reactor, and the seed in this comparison test was supplied from the final product of the system. In other words, the seed was a relatively low lime, rather than a high lime, magnesium hydroxide.

Table I sets forth the analyses of $B_2O_3$, CaO, and $SiO_2$ in the magnesium hydroxide (A) produced in the above example, the high lime magnesium hydroxide (B) removed from the first settler, and the product of the comparison example (C) wherein the decantation was omitted and the seed used was the final product. These analyses were made after washing the hydroxide. It can be seen that the product of this invention had less than 0.1% $B_2O_3$ and less than 1% CaO. As would be expected, the high lime intermediate product (2.07% CaO) also had low boron. However, the product produced in the comparison reaction, while it had less than 1% CaO, had 0.27% $B_2O_3$, a much higher amount than desired.

Each of the three magnesium hydroxides was, in the wet filter cake condition, blended with sufficient ball milled chrome ore to provide 0.2% $Cr_2O_3$ (ignited basis). Also, the $SiO_2$ content of the high lime intermediate product was increased to 0.7% to reduce the lime-silica ratio to a value nearer 2:1. After drying, each was subjected to a sintering test by first calcining at 1000° C., then compacting into briquettes at a pressure of 3800 kg/cm² (54,000 psi), and firing a small rotary kiln about 1 m in diameter by 1 m in length,

TABLE I

| | Magnesium Hydroxide | | | Periclase Grain | | | | |
|---|---|---|---|---|---|---|---|---|
| | $B_2O_3$ | CaO | $SiO_2$ | $B_2O_3$ | CaO | $SiO_2$ | BSG | Porosity |
| A | 0.08 | 0.85 | 0.37 | 0.02 | 0.85 | 0.42 | 3.41 | 4.2 |
| B | 0.04 | 2.07 | 0.29 | 0.05 | 1.72 | 0.69 | 3.46 | 2.8 |
| C | 0.27 | 0.85 | 0.25 | 0.03 | 0.63 | 0.37 | 3.25 | 8.7 |

Chemical analyses are weight percent on the ignited basis. Porosity is in volume percent.

Each of the three sets of briquettes was separately fired to a temperature of 1900° C., being held at that temperature for 30 minutes.

Table I sets forth the $B_2O_3$, CaO, and $SiO_2$ contents of these fired briquettes, together with their BSG's and corresponding porosity (in volume percent).

It can be seen that, although the $B_2O_3$ content of the comparison product was reduced by the firing to 0.03%, the BSG is considerably lower than that for the product made according to this invention and the porosity is much higher, 8.7% as opposed to 4.2%.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, an 8 mesh screen opening corresponds to 2.37 mm. Analyses of mineral components are reported in the usual manner, expressed as simple oxides, e.g. CaO and $SiO_2$, although the components may actually be present in various combinations, e.g. as calcium silicates.

We claim:

1. Method of producing magnesium hydroxide by (1) treating a brine containing $Mg^{++}$ ions and at least 1 ppm boron (on a $B_2O_3$ basis) so as to reduce its $CO_2$ content to less than 15 ppm, (2) reacting, in a first reaction stage, the treated brine with an amount of calcined lime in excess of that needed to convert the $Mg^{++}$ ion content thereof to magnesium hydroxide, (3) separating the high-lime magnesium hydroxide so produced from the spent brine, (4) recycling part of the high-lime magnesium hydroxide from the first reaction stage back to the first reaction stage as seed, and (5) reacting, in a second reaction stage, the remainder of the high-lime magnesium hydroxide produced in the first reaction stage with brine treated as in step (1), whereby a magnesium hydroxide is produced which contains, on the ignited basis, less than 1% CaO and less than 0.1% $B_2O_3$, all percentages being by weight.

2. Method according to claim 1 wherein the brine is treated with acid.

3. Method according to claim 2 wherein the acid is sulfuric acid.

4. Method according to claim 1 wherein the brine is sea water.

5. Method according to claim 1 wherein the calcined lime is contained in calcined dolomite.

6. Method according to claim 1 wherein the brine is treated to reduce its $CO_2$ content to about 10 ppm.

7. Method according to claim 1, 4, 2, 3, 5, or 6 wherein the spent brine from the first reaction stage is reacted with brine treated as in step (1) to precipitate a magnesium hydroxide of relatively high CaO and $B_2O_3$ content.

* * * * *